United States Patent [19]

Debouzie et al.

[11] Patent Number: 5,131,935
[45] Date of Patent: Jul. 21, 1992

[54] METHOD AND APPARATUS FOR FIBRING MINERAL WOOL BY FREE CENTRIFUGATION

[75] Inventors: Alain Debouzie, Le Petit Couronne; Christopher Ellison, Mont Ville; Roger Pennamen, Saint Etienne Du Rouvray, all of France

[73] Assignee: Isover Saint-Gobain, Courbevoie, France

[21] Appl. No.: 641,925

[22] Filed: Jan. 16, 1991

[30] Foreign Application Priority Data

Jan. 16, 1990 [FR] France .................. 90 00420

[51] Int. Cl.⁵ ............................................. C03B 37/05
[52] U.S. Cl. ......................................... 65/6; 65/14
[58] Field of Search ........................... 65/5, 6, 14, 15

[56] References Cited

U.S. PATENT DOCUMENTS

| | | | |
|---|---|---|---|
| 2,632,920 | 3/1953 | Koehler | 65/14 X |
| 2,700,176 | 1/1955 | Graybeal | |
| 3,045,279 | 7/1962 | Hesse | 65/14 X |
| 4,433,992 | 2/1984 | DeBouzie et al. | 65/6 X |

FOREIGN PATENT DOCUMENTS

| | | | |
|---|---|---|---|
| 0195725 | 9/1986 | European Pat. Off. | |
| 919096 | 10/1954 | Fed. Rep. of Germany | |
| 2106430 | 5/1972 | France | |
| 2322114 | 3/1977 | France | |
| 1433920 | 10/1988 | U.S.S.R. | 65/6 |
| 867299 | 5/1961 | United Kingdom | 65/6 |
| 8807980 | 10/1988 | World Int. Prop. O. | 65/6 |

*Primary Examiner*—Robert L. Lindsay
*Attorney, Agent, or Firm*—Oblon, Spivak, McClelland, Maier & Neustadt

[57] ABSTRACT

A method and an apparatus for fibring mineral wool by free centrifugation. An auxiliary gas current is generated at a distance from the centrifuging wheels in substantially the same direction as a main gas current which is emitted in the immediate proximity of the centrifuging wheels. This auxiliary gas current is obtained by passing air between the centrifuging wheels and/or through use of a supplementary blower ring. The invention applies particularly to the production of rock wool.

22 Claims, 3 Drawing Sheets

FIG_1

METHOD AND APPARATUS FOR FIBRING MINERAL WOOL BY FREE CENTRIFUGATION

BACKGROUND OF THE INVENTION

1. Field of the Invention

The invention is concerned with techniques for forming mineral fibers from a drawable material and in particular from a molten material with a high melting point, for example a material of the basalt or blast furnace slag type. More precisely, the invention relates to an improvement in the so-called free centrifugation fibring techniques in which the material to be fibered is brought to the molten state at the periphery of centrifuging wheels and is entrained by these wheels so that a part of the material becomes detached therefrom and is transformed into fibers under the effect of centrifugal force, the remaining non-transformed part being sent back to another wheel or, after the last wheel, falls down in the form of granules.

2. Background of the Related Art

In order to employ the fibring technique briefly outlined hereinabove, generally three or four wheels are used which are disposed one beside another, two successive wheels in the path of the molten material rotating in opposite directions. The first wheel is supplied with molten material by a spout and mainly serves to accelerate the material which is passed on towards the second wheel and so on until it reaches the last wheel, the flow of material diminishing at each wheel by the amount of the quantity of fibers formed. With such a fibring process—partial in that none of the wheels is sufficient for complete transformation into fibers—it is very important to provide effective means of separating the fibred material from the non-fibred material. Indeed, this latter only helps to increase the weight of the end product and give it a particularly unpleasant feel. Independently of this first problem, the fibred material has to be routed to a receiving means, for example an endless belt fitted with vacuum chambers which transports the fibers to processing devices downstream of the line, such as a lapper, a binder polymerizing oven, etc.

This dual function of separating granules and transporting fibers falls to a current of air introduced at the periphery of the centrifuging wheels, substantially parallel with the axes of rotation of the wheels. Thus, this current of air entrains the fibers in a direction at right-angles to the direction in which they are formed. In Patent Application FR-A-2 322 114, it has been proposed to impart to the current not only an axial velocity but a certain tangential velocity in the direction of movement of the rotor in order to open up the torus consisting of the fibers around the centrifuging wheel; thus, the fibers have a tendency to spread out immediately over a greater volume so that there is a reduced risk of seeing the fibers stick together in tufts. In fact, these tufts would result in a reduced tensile strength in the product. Furthermore, it is known from Patent Application WO-A-8 807 980 to introduce the current of air otherwise than parallel with the axes of rotation of the centrifuging wheels, in fact in a slightly diverging direction, so forming a blowing cone; furthermore, a tangential component of velocity is likewise imparted to the currents of air, the object being to minimize interaction between the gas current and the centrifuging wheels in order to reduce friction between this gas current and the currents of air generated by the high speed rotation of the centrifuging wheels.

These various improvements do not make it possible to obviate the problem caused by the formation of fiber tufts which is encountered in all the relatively calm zones surrounding the centrifuging wheels, particularly the central zone between the wheels. In the end, these tufts are carried away with the flow of newly formed fibers but generally this occurs sufficiently late that the resin which is sprayed onto the fibers while they are being formed is already partly polymerized; consequently, these tufts crop up again in the finished product as isolated rovings which tend to reduce the tensile strength because for practical purposes they are not connected to the rest of the fibers. Furthermore, these rovings entrain with them non-fibred particles which make only a very slight contribution to the heat resistance of the rock wool mat. Above all, their presence penalizes the lightest products, particularly the finished products the density of which is less than 100 kg/m³. As indicated in the aforesaid Patent Application FR-A-2 322 114, it is not desirable excessively to increase the quantity of air introduced at the periphery of the centrifuging wheels, in order to avoid excessive cooling of the wheels. Consequently, air is not blown into the intermediate space between the wheels and the quantity of air blown outside the wheels is limited, creating calm zones with the disadvantages which have been discussed.

SUMMARY OF THE INVENTION

The present invention sets out to improve the techniques for forming rock wool—from basaltic glasses, blast furnace slag or other materials with a high melting point using centrifuging wheels in order to obtain better control over the circulation of gases in the vicinity of the centrifuging wheels and thus produce finished products of greater quality, particularly from the point of view of their insulating capacity.

For this, the invention proposes a method of forming mineral fibers in which the material to be fibred, while in the molten state, is poured onto the peripheral surface of the first of a series of centrifuging wheels rotating at high speed, is considerably accelerated there and is sent back to the second wheel, whence a part of the material is transformed to fibers by the effect of centrifugal force, the remaining part possibly being sent onto the following wheel and so on, and in which the fibers formed by the various centrifuging wheels are taken up by a flow of gas surrounding the series of centrifuging wheels, emitted in the immediate proximity of the wheels in a direction substantially parallel with their axes of rotation. The improvement according to the invention resides in generating in addition at least one auxiliary gas current at a distance from the centrifuging wheels, the said auxiliary gas current being oriented substantially in the same direction as the main gas current.

The principle of the auxiliary gas current is to suppress all the return current which would otherwise form for example in the central zone of the fibring apparatus, between the centrifuging wheels, or outside the apparatus with increasing remoteness from the periphery of the wheels.

With regard to the central zone, this auxiliary gas current may advantageously be generated by passing air between the centrifuging wheels, the air being induced by rotation of the wheels. In this way, it is possible to avoid the formation of return currents which tend to result in a certain amount of fiber penetrating the zone between the centrifuging wheels, in the center of the fibring machine. It must be noted that to obtain this passage of ambient air, it is sufficient not to occlude the back of the machine, a measure which is easily achieved, particularly by a sideways arrangement of the motors which drive the wheels. In this way, excessive cooling of the wheels is avoided and the fibring is not affected.

With regard to the zone outside the centrifuging wheels, the auxiliary gas current is advantageously generated by a peripheral blower ring which backs up the blower means which generate the main gas current. This peripheral blower ring makes it possible very precisely to control the conditions under which fibers are transported to the receiving means; furthermore, once such transport is assured, the main blower means can then be regulated solely on the basis of conditions needed to produce a better quality of fiber formation, that is to say conditions which result in optimum drawing of the fibers by the main gas current.

Thus it is possible to work with a main blower means which emits a jet which passes over the peripheral surfaces of the centrifuging wheels at a very high velocity, without excessively increasing the rate of delivery of this main blower means; advantageously, distribution of the rate of flow between the two blower means is around 3:2, that is to say approximately 60% of the air drawn into the fibring apparatus is drawn in by means of the main arrangement, the rest being drawn in by the auxiliary means.

Also advantageously, the auxiliary gas current is emitted at a speed which is approximately one-fourth the rate of emission of the main gas current. It is indeed preferable to work at a high speed in the immediate vicinity of the centrifuging wheels—which produces increased efficiency of the gas drafting or drawing out process; on the other hand, as one moves away from the periphery of the wheels, it is preferable to find slower gas currents there, so that the difference in speed between these gases emitted by the blower means and the ambient air is not excessive so that there are no countercurrents due to impacts among the various air masses.

It is likewise an object of the invention to provide an apparatus for producing mineral fibers from a material with a high melting point, such as basalt glass, blast furnace slag or other similar materials. To this end, it proposes an apparatus comprising a series of centrifuging wheels disposed in an arrangement which brings their peripheral surfaces close to one another, driven in a rapidly rotating fashion by motors, two consecutive wheels in the path of the material to be fibred turning in opposite directions, a rising feed of molten material making it possible for the said material to be poured onto the outer surface of the first centrifuging wheel, a blower means generating around the series of centrifuging wheels a gas current parallel with the axes of rotation of the centrifuging wheels, the improvement residing in the fact that the motors are disposed sideways, outside the assembly constituted by the series of centrifuging wheels and entraining the wheels by means of mechanical transmission means disposed so that an air passage remains through the series of centrifuging wheels.

The invention thus proposes two possibly complementary embodiments which set out to improve the conditions under which gas circulates around the centrifuging wheels, whether between the wheels or on their periphery. Various other advantageous improvements may also be made; for example, it is worthwhile for the conditions under which air circulates around the machine—and even at a relatively great distance to be as homogeneous as possible, which is why the machine is preferably mounted on feet in order to leave free the space under the machine. It is also preferable to protect the mechanical transmission means by providing shaped caps which facilitate the gas flow. Likewise, it is worthwhile to locate the air, water and binder supply pipes under these caps or covers. Still with the same idea of encouraging the flow of induced gases between the centrifuging wheels, it is advantageous to use slightly frustoconical wheels which reduce in size with increasing length.

With regard to the conditions under which gas circulates over the periphery of the centrifuging wheels, it is more particularly advantageous to work with a second peripheral blower ring, consisting for example of a series of large diameter jets, the minimum distance between the axis of one jet and the periphery of a centrifuging wheel advantageously being between 70 and 150 mm and preferably between 80 and 100 mm. This second peripheral ring backs up a main ring, the action of which may be limited to an action of drawing out the fibers at the very moment when they are being formed. To promote drawing out the fibers, it is advantageous to work with a main blower ring consisting of a lip emitting a gas current which washes over the periphery of the centrifuging wheels, the said lip being bounded on the one side by the wheels themselves and being at a radial distance of around 5 to 10 mm from the closest centrifuging wheel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

Figure 1:
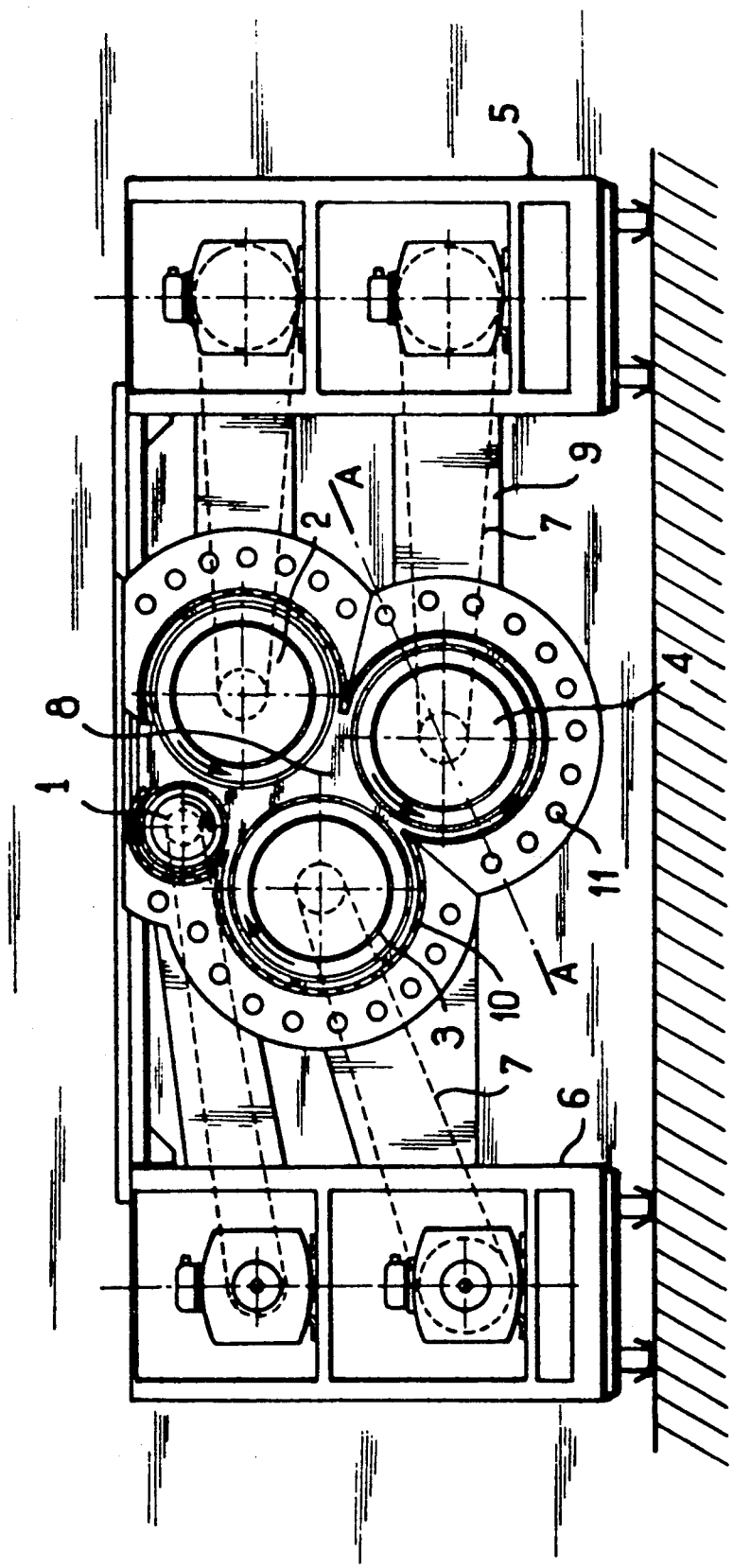
FIG. 1 is a front view of a fibring apparatus according to the invention, with four centrifuging wheels.

Referring now to the drawings, wherein like reference numerals designate identical or corresponding parts throughout the several views, and more particularly to FIG. 1 thereof, FIG. 1 is a front view of a fibring apparatus according to the invention, seen from the fibre side. This apparatus consists essentially of four centrifuging wheels 1, 2, 3, 4. All of the wheels have the same diameter with the exception of the first wheel 1, which is smaller. The wheels 1, 2, 3, 4 are disposed in an arrangement which brings their peripheral surfaces close to one another. These wheels 1, 2, 3, 4 are rotated by means of drive units 5, 6 which act through transmission belts 7, the two wheels on the right being driven for instance in a clockwise direction while the two wheels on the left are driven in the opposite direction, so that two consecutive wheels in the path of the material to be fibred (which descends from the highest wheel 1 to the lowest wheel 4) turn in opposite directions. The drive units 5, 6 are disposed on each side of the series of wheels 1, 2, 3, 4, and thus the rear of the machine is free from obstruction by the drive units and ambient air is able to pass freely between the wheels at the level of the central zone 8. The drive units are mounted on a chassis supporting the whole of the machine, resting on the ground on feet or wheels which roll on rails, which makes it possible if necessary to move the machine for servicing. The transmission belts 7 are enclosed by profiled covers 9 in order to avoid dead zones at the rear of the machine, which facilitates the induction of air through the central zone 8.

As they turn at high speed, the wheels give rise to the formation of a flow of induced air which sweeps through the central zone 8, preventing in it the accumulation of fibers which otherwise fall as rovings and it is well known that these adversely affect the final quality of the product. Furthermore, as the environment of the machine is extremely drafty, the rotation of the wheels creates a kind of gaseous envelope at a distance from the wheels and this also tends to "clean" the machine.

The series of wheels 1, 2, 3, 4 is surrounded by a peripheral blower means 10 constituted by a continuous blower nozzle emitting a current of drafting gas essentially parallel with the axes of rotation of the centrifuging wheels. This main gas current essentially has the task of assisting with drawing out the fibers which, under the effect of centrifugal force, become detached from the peripheral wall of the centrifuging wheels. As the fibers formed are very fine, they cool very rapidly; this drafting action is therefore at its maximum in the immediately vicinity of the wall of a wheel, which explains the attraction of a flow of gas which sweeps over the surface.

The blower nozzle 10 is backed up by an assembly of large diameter nozzles 11 which emit jets of air which are substantially parallel to the main gas current and the purpose of which will now be explained more precisely with reference to FIG. 2 which diagrammatically shows a cross-section through a centrifuging wheel taken on the line A—A in FIG. 1.

Figure 2:
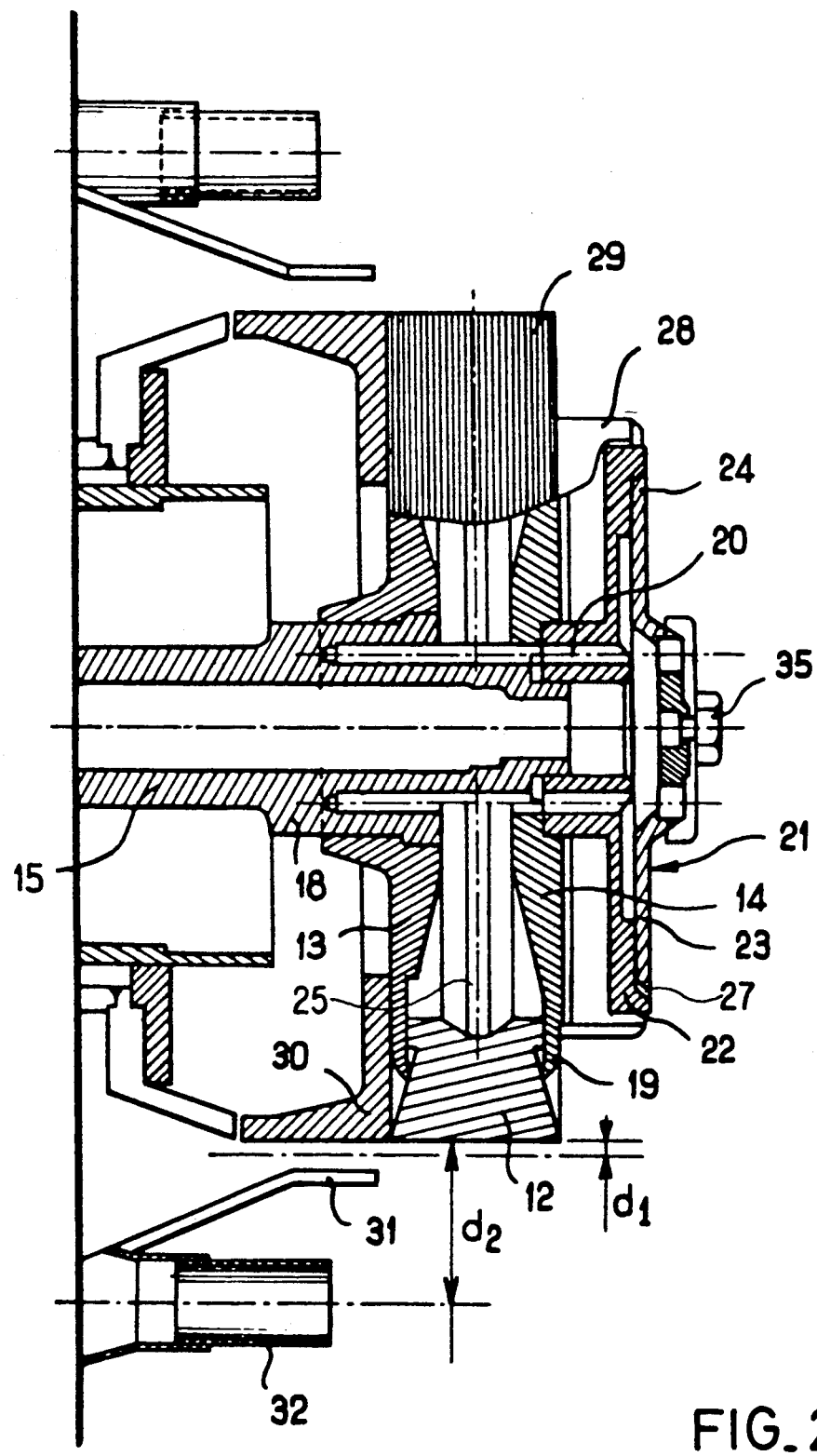
FIG. 2 is a detailed side view of a centrifuging wheel according to FIG. 1.

Shown in FIG. 2 is a centrifuging wheel constituted by a rim 12 supported by wheel discs 13, 14. The wheel is rotated by its shaft 15. The disc 13 rests against an abutment 18 on the shaft 15; discs 13 and 14 retain the rim 12 by means of projections 19. Locking screws 20 likewise fix on the shaft 15 an atomizer disc 21 consisting of two discs 22, 23 associated by screws 24. The cooling water is conveyed to the rim 12 by a groove 25 fed through apertures 26 and is discharged through orifices disposed on the sides of the wheel and not shown here. The composition of the binder supply is conveyed as far as the compartment bounded by the two discs 22, 23 and escapes through grooves 27 in the form of droplets which burst under the action of the peripheral gas current.

FIG. 2 likewise shows a small collar 28 which serves as a protection for the diffuser disc and prevents penetration of fibers between the discs 14 and 22. Also shown in the upper part of the drawing is the outer part of the rim 12 which has a certain number of longitudinal grooves 29 adapted to encourage clinging of the material to be fibered.

Over quite a portion of its periphery, the centrifuging wheel is enclosed by a blower means. The blower means is bounded on the one hand by the rear disc 30 rigidly driven with a rotary movement together with the wheel and the fixed wall 31. The radial distance $d_1$ separating the nozzle from the wheel is preferably between 5 and 10 mm. This distance $d_1$ and the rate of flow of supply air are advantageously chosen so that the average speed of the main gas current emitted is greater than or equal to 100 m/s in order to optimize the drawing out of fibers by this gas current.

The gas current is essentially emitted parallel with the axis of rotation of the shaft 15 while a certain tangential component may be imparted to it in accordance with the teachings of FR-A-2 322 114.

It should be noted that this current of air, although of great velocity, acts only on the lightest particles which are the fibers; the non-fibred particles which are very highly accelerated by rotation of the wheels do not for practical purposes see their trajectory altered, so that the separating action is not affected.

If such gas velocities are favorable in connection with fiber formations, they do lead to important impacts with the surrounding air masses. These are likely to lead to the formation of return currents all around the series of centrifuging wheels. This formation is advantageously prevented by the establishment of the second peripheral blower ring which serves to create a second gas current which is less rapid but which is oriented in the same direction as the main blower current.

This second blower ring is for example constituted by a series of nozzles 32 of relatively large diameter, preferably greater than 25 mm, being for example between 30 and 50 mm. The nozzles 32 each emit an air jet, the velocity of which is for example around one quarter of the velocity of the gases emitted by the main ring. The radial distance $D_2$ separating the central axis of these nozzles 32 from the closest centrifuging wheel is advantageously between 70 and 150 mm and preferably between 80 and 100 mm. At such a distance, it may be considered that these nozzles 32 have no action on the formation of fibers and that their role is therefore essentially a role of entraining and separating fibers from the mass of non-fibred particles. Good results are obtained when about 40% of the total quantity of gas blown around the centrifuging wheels is due to the action of these auxiliary nozzles 32.

Figure 4:
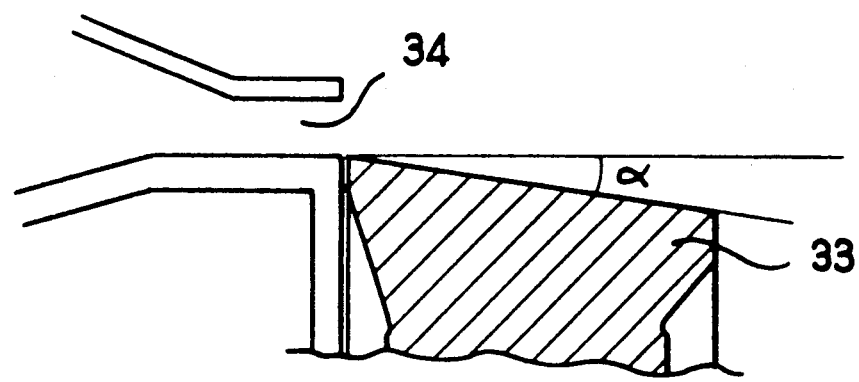
FIG. 4 is a diagram of a frustoconical centrifuging wheel.

Other measures may also help to improve the fibring apparatus. The most important, shown diagrammatically in FIG. 4, consists of using frustoconical centrifuging wheels instead of those which consist of straight cylinders. The result is a wheel of which the rim 33 becomes thinner in the direction of the gas current emitted by the means 34 of emitting the main gas current. The cone angle $\alpha$ is for example close to 15°. In this way, it is possible to assist with eliminating suppressions at the level of the central zone 8.

Another interesting measure resides in protecting the nose 35 of the centrifuging wheel with a profiled cover, for example of lozenge shape, which also assists the flow of gases close to the central zone 8. The caps on the centrifuging wheels may likewise be protected by a lozenge shaped cover.

Comparison of products obtained according to the prior art, for example with an apparatus according to the teachings of Patent Application EP-A-195 725, reveals improvements on two very important and specific points. Firstly, the rate of non-fibred material in the end product decreases quite substantially which inter alia means an end product which has a far more pleasant feel.

Figure 3:
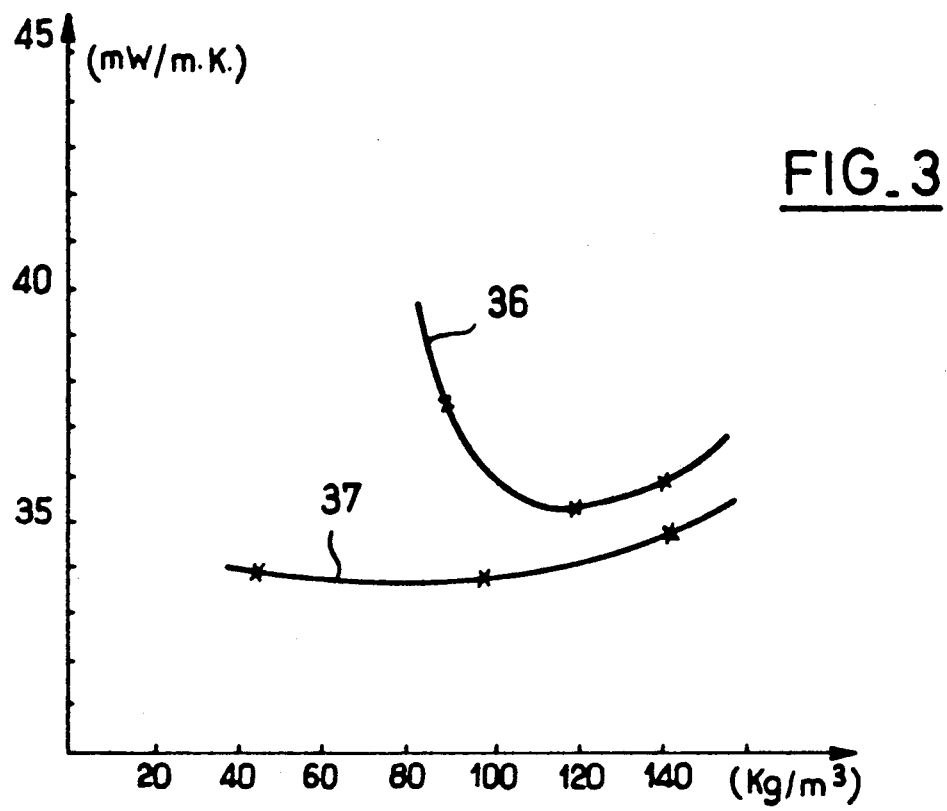
FIG. 3 shows comparative curves for heat conductivity as a function of density for mineral wool felts obtained by the apparatuses according to the prior art compared with the apparatus in FIG. 1.

Moreover, for equal density, the heat resistance of the end products is enhanced as can b seen by examining FIG. 3 which shows the curves for the Lambda heat conductivity rates (in mW/m.K) for various densities (in kg/m$^3$) of products obtained according to the prior art (curve 36) or with an apparatus according to the invention (curve 37), the heat resistance being of course inversely proportional to the heat conductivity. The increase in heat resistance already true in the prior art for relatively heavy products of which the density is for example greater than 100 kg/m$^3$ is still quite especially true of lighter products produced according to the invention. For example, those products of the present invention having a density of between 40 and 100 kg/m$^3$ have a high heat resistance, a property virtually impossible to product with apparatuses according to the prior art, the curve 36 showing virtually an asymptotic line at a density of around 80 kg/m$^3$.

What is claimed as new and desired to be secured by Letters Patent of the United States is:

1. A method of forming mineral fibers comprising the steps of:
    rotating a plurality of centrifuging wheels at high speed about substantially parallel rotation axes;
    pouring a material to be fibred in a molten state over the peripheral surface of a first rotating centrifuging wheel, thereby accelerating the molten material and sending it on to a second centrifuging wheel;
    converting part of the molten material to fibers as it passes around said plurality of centrifuging wheels due to the effects of the centrifugal forces provided by the centrifuging wheels;
    passing a main gas current around said plurality of centrifuging wheels, said main gas current being emitted in the immediate vicinity of said wheels in a direction substantially parallel with the axes of rotation of the wheels; and
    passing an auxiliary gas current at least partly through a substantially ring-shaped arrangement of nozzles provided radially outward of said main gas current, each of said nozzles being located at a distance $d_2$ from one of said centrifuging wheels, said auxiliary gas current being oriented in substantially the same direction as the main gas current.

2. A method of forming mineral fibers comprising the steps of:
    rotating a plurality of centrifuging wheels at high speed about substantially parallel rotation axes;
    pouring a material to be fibred in a molten state over the peripheral surface of a first rotating centrifuging wheel, thereby accelerating the molten material and sending it on to a second centrifuging wheel;
    converting part of the molten material to fibers as it passes around said plurality of centrifuging wheels due to the effects of the centrifugal forces provided by the centrifuging wheels;
    passing a main gas current around said plurality of centrifuging wheels, said main gas current being emitted in the immediate vicinity of said wheels in a direction substantially parallel with the axes of rotation of the wheels; and
    passing an auxiliary gas current at a distance from the centrifuging wheels, said auxiliary gas current being oriented in substantially the same direction as the main gas current,
    wherein the step of passing an auxiliary gas current includes a step of generating at least part of the auxiliary gas current through the rotation of the centrifuging wheels, thereby drawing ambient air between the centrifuging wheels.

3. The method according to claim 1, further comprising the steps of:
    generating the main gas current using a blower means.

4. The method according to claim 3, wherein the step of generating the main gas current provides approximately 60% of a total quantity of air blown around the series of centrifuging wheels.

5. The method according to claim 1, further comprising a step of generating said auxiliary gas current at a velocity approximately equal to one quarter of the velocity of said main gas current.

6. The method according to claim 3, wherein the step of generating said main gas current generates gases having a velocity greater than or equal to 100 m/s.

7. An apparatus for producing mineral fibers comprising:
    a series of centrifuging wheels having peripheral surfaces disposed close to one another;
    a path formed among said series of centrifuging wheels for receiving a material to be fibred;
    first and second centrifuging wheels included among said series of centrifuging wheels;
    motive means for rapidly rotating said first and second centrifuging wheels in opposite directions about substantially parallel rotation axes;
    a main blowing means generating a current of gas around said first and second centrifuging wheels, said current of gas being substantially parallel with the axes of rotation of said first and second centrifuging wheels; and
    complementary means for generating at least one auxiliary gas current at a distance from the centrifuging wheels in and substantially the same direction as the main gas current; wherein said complementary means comprises a plurality of complementary nozzles arranged in substantially a ring-shape encircling said main blowing means and said centrifuging wheels.

8. An apparatus according to claim 7, wherein the complementary means includes a blower placed at a distance rom the main blowing means.

9. An apparatus according to claim 7, wherein the centrifuging wheels are frustoconical.

10. An apparatus for producing mineral fibers according to claim 7, wherein the main blowing means comprises a main blower and a main blower nozzle, an said main blower nozzle is bounded on an inner face by one of said centrifuging wheels.

11. An apparatus according to claim 7, wherein the diameter of each complementary nozzle is greater than 25 mm.

12. An apparatus according to claim 11, wherein the minimum distance $d_2$ between the axis of one of said complementary nozzles and the periphery of one of said centrifuging wheels is between 70 and 150 mm.

13. An apparatus according to claim 12, wherein the distance $d_2$ is between 80 and 100 mm.

14. An apparatus according to claim 10, wherein a radial distance $d_1$ measured between the main blower nozzle and the wheel is between 5 and 10 mm.

15. An apparatus according to claim 7, wherein the centrifuging wheels have caps protected by covers.

16. An apparatus for producing mineral fibers according to claim 7, wherein the apparatus is supported by a chassis placed on feet in such a way as to leave an empty space under the machine.

17. An apparatus for producing mineral fibers comprising:
- a series of centrifuging wheels adapted to rotate about substantially parallel axes and disposed in an arrangement which brings outer peripheral surfaces of said centrifuging wheels close to one another;
- first and second centrifuging wheels included in said series of centrifuging wheels, said first centrifuging wheel being adapted to receive molten material from a supply means;
- motive means for inducing an auxiliary flow of air between said centrifuging wheels by providing rapid rotation to said centrifuging wheels and rotating said first and second centrifuging wheels in opposite directions, said motive means being offset from said rotation axes by a distance perpendicular to said rotation axes and thereby permitting said auxiliary flow of air to pass between said centrifuging wheels; and
- a main blower means for creating a main gas current around the series of centrifuging wheels in a direction substantially parallel with said axes of rotation of said centrifuging wheels, said main gas current creating a maximum drafting action in the immediate vicinity of an external peripheral wall of each of said centrifuging wheels.

18. The apparatus according to claim 17, wherein said motive means includes a plurality of motors.

19. The apparatus according to claim 18, wherein the motors entrain said centrifuging wheels by means of mechanical transmissions which are so disposed as to allow air to pass through the series of centrifuging wheels.

20. The apparatus according to claim 17, wherein the mechanical transmissions are each protected by a profiled cover which also encloses air supply pipes associated with the centrifuging wheels.

21. The apparatus for producing mineral fibers according to claim 17, further comprising complementary air blower means disposed at a distance from the main blower means.

22. The apparatus for producing mineral fibers according to claim 17, wherein said main gas current attains an average speed of at least 100 m/s at a distance of 5 to 10 mm from said external peripheral wall of each of said centrifuging wheels.

* * * * *